United States Patent
Yellapantula et al.

(10) Patent No.: US 12,362,867 B2
(45) Date of Patent: Jul. 15, 2025

(54) SYSTEM AND METHOD FOR USING A TESTER TO PERFORM TIME-SWITCHED MULTIPLE INPUT, MULTIPLE OUTPUT (MIMO) DATA PACKET SIGNAL ANALYSIS

(71) Applicant: LitePoint Corporation, San Jose, CA (US)

(72) Inventors: RamaKrishna Venkata Surya Yellapantula, Vernon Hills, IL (US); Malhar D. Vaishnav, Gilberts, IL (US); Brett Lee Robertson, Mundeliein, IL (US); Niels Vinggaard, Santa Clara, IL (US)

(73) Assignee: LitePoint Corporation, San Jose, CA (US)

( * ) Notice: Subject to any disclaimer, the term of this patent is extended or adjusted under 35 U.S.C. 154(b) by 119 days.

(21) Appl. No.: 17/404,774

(22) Filed: Aug. 17, 2021

(65) Prior Publication Data

US 2023/0058324 A1 Feb. 23, 2023

(51) Int. Cl.
*H04L 1/1829* (2023.01)
*H04B 7/0417* (2017.01)
*H04B 7/0456* (2017.01)
*H04B 7/08* (2006.01)

(52) U.S. Cl.
CPC ......... *H04L 1/1845* (2013.01); *H04B 7/0417* (2013.01); *H04B 7/0456* (2013.01); *H04B 7/08* (2013.01)

(58) Field of Classification Search
CPC ... H04L 1/1845; H04B 7/0417; H04B 7/0456; H04B 7/08
See application file for complete search history.

(56) References Cited

U.S. PATENT DOCUMENTS

| | | | |
|---|---|---|---|
| 5,497,383 A | 3/1996 | Thome et al. | |
| 5,815,507 A | 9/1998 | Vinggaard et al. | |
| 6,298,084 B1 | 10/2001 | Vinggaard et al. | |
| 7,484,146 B2 | 1/2009 | Olgaard et al. | |
| 7,564,896 B2 | 7/2009 | Olgaard | |
| 7,567,521 B2 | 7/2009 | Olgaard et al. | |
| 7,706,250 B2 | 4/2010 | Olgaard et al. ......... | H04J 11/00 |
| 7,822,130 B2 | 10/2010 | Walvis et al. ............ | H04K 1/10 |

(Continued)

FOREIGN PATENT DOCUMENTS

WO 2014144410 A1 9/2014
WO 2018204037 A1 11/2018

(Continued)

OTHER PUBLICATIONS

Kumar, D. (Apr. 4, 2020). 5G(NR): Frame structure( slots and symbols formats). 5G(NR): Frame structure( Slots and symbols Formats). https://www.5gfundamental.com/2020/04/5gnr-frame-structure-slots-and-symbols.html.*

(Continued)

*Primary Examiner* — Michael J Moore, Jr.
(74) *Attorney, Agent, or Firm* — ArentFox Schiff LLP

(57) ABSTRACT

System and method for implementing a time-switched MIMO signal analysis using a single RF signal receiver to capture the multiple incoming data packet signals. In accordance with example embodiments, like portions of repetitive data slots may be captured with a periodicity equal to that of their host repetitive data frames.

21 Claims, 3 Drawing Sheets

(56) References Cited

U.S. PATENT DOCUMENTS

| | | | |
|---|---|---|---|
| 7,962,823 B2 | 6/2011 | Olgaard | G01R 31/28 |
| 8,312,329 B1 | 11/2012 | Yellapantula et al. | |
| 8,811,461 B1 | 8/2014 | Huynh | |
| 8,841,923 B1* | 9/2014 | Vanwiggeren | G01R 19/0053 |
| | | | 324/606 |
| 8,879,659 B1* | 11/2014 | Olgaard | H04B 17/14 |
| | | | 375/267 |
| 8,917,761 B2 | 11/2014 | Olgaard | |
| 9,077,535 B2 | 7/2015 | Olgaard | |
| 9,671,445 B2 | 6/2017 | Huynh et al. | G01R 29/10 |
| 9,678,126 B2 | 6/2017 | Huynh | G01R 29/10 |
| 9,749,097 B2 | 8/2017 | Yellapantula et al. | |
| 9,774,406 B2 | 9/2017 | Huynh | H04B 17/00 |
| 9,794,009 B1 | 10/2017 | Olgaard et al. | |
| 9,923,647 B1 | 3/2018 | Olgaard et al. | |
| 10,009,126 B2 | 6/2018 | Olgaard et al. | |
| 10,079,626 B1 | 9/2018 | Olgaard et al. | |
| 10,666,542 B1 | 5/2020 | Olgaard et al. | |
| 10,819,616 B2 | 10/2020 | Olgaard et al. | |
| 2003/0063694 A1 | 4/2003 | Goldberg et al. | |
| 2005/0152279 A1 | 7/2005 | Robertson et al. | |
| 2006/0210004 A1 | 9/2006 | Yellapantula et al. | |
| 2007/0070691 A1 | 3/2007 | Olgaard et al. | |
| 2007/0070881 A1 | 3/2007 | Olgaard et al. | |
| 2007/0294378 A1* | 12/2007 | Olgaard | H04L 41/14 |
| | | | 709/223 |
| 2008/0084951 A1* | 4/2008 | Chen | H04L 1/06 |
| | | | 375/347 |
| 2008/0172588 A1* | 7/2008 | Olgaard | H04L 43/50 |
| | | | 714/742 |
| 2009/0135752 A1 | 5/2009 | Su et al. | |
| 2010/0063791 A1* | 3/2010 | Wen | H04B 17/336 |
| | | | 703/13 |
| 2010/0069106 A1* | 3/2010 | Swarts | H04W 56/00 |
| | | | 455/502 |
| 2010/0123471 A1* | 5/2010 | Olgaard | H04L 1/06 |
| | | | 324/750.3 |
| 2011/0230143 A1* | 9/2011 | Lundstrom | H04W 24/06 |
| | | | 455/67.11 |
| 2011/0314333 A1 | 12/2011 | Olgaard et al. | |
| 2012/0020033 A1 | 1/2012 | Pilditch et al. | |
| 2012/0020335 A1 | 1/2012 | Yellapantula et al. | |
| 2012/0051224 A1 | 3/2012 | Olgaard et al. | |
| 2012/0113829 A1 | 5/2012 | Olgaard et al. | |
| 2012/0176952 A1 | 7/2012 | Huang et al. | |
| 2012/0269288 A1* | 10/2012 | Olgaard | H04L 1/24 |
| | | | 375/295 |
| 2013/0188678 A1 | 7/2013 | Olgaard et al. | |
| 2013/0295858 A1 | 11/2013 | Olgaard et al. | |
| 2013/0301694 A1* | 11/2013 | Olgaard | H04B 7/0413 |
| | | | 375/224 |
| 2014/0140319 A1* | 5/2014 | Doetsch | H04B 7/024 |
| | | | 370/330 |
| 2014/0266929 A1 | 9/2014 | Huynh et al. | |
| 2014/0266930 A1 | 9/2014 | Huynh | |
| 2014/0273873 A1 | 9/2014 | Huynh | |
| 2015/0055504 A1 | 2/2015 | Bellamkonda et al. | |
| 2015/0063133 A1* | 3/2015 | Olgaard | H04B 17/0085 |
| | | | 370/252 |
| 2015/0078196 A1 | 3/2015 | Olgaard | |
| 2015/0092824 A1* | 4/2015 | Wicker, Jr. | H04L 25/0204 |
| | | | 375/224 |
| 2015/0180591 A1* | 6/2015 | Olgaard | H04B 17/29 |
| | | | 375/224 |
| 2015/0256993 A1 | 9/2015 | Bellamkonda et al. | |
| 2016/0029279 A1 | 1/2016 | Bellamkonda et al. | |
| 2016/0036508 A1 | 2/2016 | Szini et al. | |
| 2016/0037480 A1 | 2/2016 | Bellamkonda et al. | |
| 2016/0248496 A1 | 8/2016 | Bellamkonda et al. | |
| 2016/0359591 A1 | 12/2016 | Yellapantula et al. | |
| 2016/0359717 A1 | 12/2016 | Sheya et al. | |
| 2016/0359718 A1 | 12/2016 | Banerjee et al. | |
| 2016/0365903 A1 | 12/2016 | Szini et al. | |
| 2016/0373170 A1 | 12/2016 | Szini et al. | |
| 2016/0373196 A1* | 12/2016 | Stott | H04W 24/06 |
| 2018/0003418 A1 | 1/2018 | Hu et al. | |
| 2019/0013849 A1* | 1/2019 | Kobayashi | H04B 7/0617 |
| 2022/0052900 A1* | 2/2022 | Chermon | H04L 43/04 |
| 2023/0058324 A1* | 2/2023 | Yellapantula | H04B 7/08 |
| 2023/0345500 A1* | 10/2023 | Xie | H04L 5/0053 |
| 2024/0012040 A1* | 1/2024 | Wane | G01R 29/10 |

FOREIGN PATENT DOCUMENTS

| | | | |
|---|---|---|---|
| WO | WO-2020076625 A1 * | 4/2020 | H04B 17/318 |
| WO | 2020234902 A1 | 11/2020 | |

OTHER PUBLICATIONS

International Search Report for International Application No. PCT/US2022/074727, issued Nov. 28, 2022, (3 pages).

Written Opinion for International Application No. PCT/US2022/074727, issued Nov. 28, 2022, (3 pages).

Laurent Bako et al., Identification of MIMO switched state-space models. American Control Conference, ACC 2013, Jun. 2013, Washington, United States. pp. CD-ROM. hal-00798991, (7 pages).

International Preliminary Report on Patentability in Application No. PCT/US2022/074727, dated Feb. 29, 2024, 5 pages.

Extended European Search Report mailed Oct. 22, 2024, for Application No. 22859288.7 (34 pages).

* cited by examiner

SYSTEM AND METHOD FOR USING A TESTER TO PERFORM TIME-SWITCHED MULTIPLE INPUT, MULTIPLE OUTPUT (MIMO) DATA PACKET SIGNAL ANALYSIS

BACKGROUND

The present invention relates to testing multiple input, multiple output (MIMO) data packet signal transmitters, and more particularly, using a single radio frequency (RF) data packet signal receiver to perform time-switched MIMO data packet signal analyses.

Increasingly, many well-known and popular data communications systems communicate via digital data signals in which the data is distributed among a number of data packets which are transmitted sequentially and then reassembled within the receiver, often following transmission along various distinct signal paths (e.g., as is done with the Internet). Conventional test equipment for measuring these data signals capture these data packets, store them and then transfer them for analysis. Often, the transfer and analysis of the captured data takes longer than the process by which they are captured from within the data signal, in part because of the need to transfer the captured data to remote analysis circuitry (e.g., a computer separate from the test equipment). Consecutive data packets are often closely spaced, particularly within data signals being transmitted at high data rates. Accordingly, conventional test equipment will often not measure consecutive packets, but instead will capture non-adjacent packets spaced in time by an interval approximating the time needed for analysis or measurement.

However, it is often desirable to capture consecutive packets, e.g., to analyze power variations from one packet to another. To do this with conventional test equipment, it would generally be necessary to increase the time interval available for capturing the data packets, thereby causing the capture window to become equal to the duration of the number of consecutive data packets sought to be captured and analyzed. This, however, is disadvantageous due to the fact that increasing the capture window will also slow down the overall data capture and analysis operation, since more data will need to be transferred between the capture memory and analysis engine. Further, in many communication systems, the data packets are not closely spaced, which means that much of the captured data is unused since it corresponds to the gaps between consecutive data packets.

Also, in multiple-input, multiple-out (MIMO) systems with a single data analysis engine, such as is often done in a production test environment, time efficiency in capturing and analyzing data packets becomes even more important. As is well known, a MIMO system uses multiple transmitters operated in parallel. Testing one transmitter at a time requires that the overall system be maintained in a transmit state of operation longer, and thereby potentially affect its performance due to increased heat buildup. To effectively avoid this would require testing one transmitter, powering the unit down, waiting for it to stabilize in its off state, and then power the unit up again to test the next transmitter, and so on. As a result, overall test time would increase significantly.

More recent testing implementations have the multiple transmitters of the MIMO system under test operating as normal, and have required use of multiple receivers in the tester so as to capture the multiple incoming data packet streams for coordinated analyses. However, this imposes significant increased costs for the additional data packet receiver(s) and associated synchronization hardware and software.

SUMMARY

A system and method for implementing a time-switched MIMO signal analysis using a single RF signal receiver to capture the multiple incoming data packet signals. In accordance with example embodiments, like portions of repetitive data slots may be captured with a periodicity equal to that of their host repetitive data frames.

In accordance with an exemplary embodiment, a method for capturing multiple portions of a radiative multiple input, multiple output (MIMO) data packet signal received via a plurality of signal channels defining a channel matrix includes: receiving, via a plurality of signal channels, a radiative multiple input, multiple output (MIMO) data packet signal, wherein the MIMO data packet signal includes a plurality of data packet streams, each of the plurality of data packet streams includes a like plurality of repetitive data frames having a like periodicity, each of the plurality of repetitive data frames includes a like plurality of repetitive data slots, each of the plurality of repetitive data slots includes a like plurality of data symbols, each of the plurality of data symbols of a first one of the plurality of data packet streams includes a first reference symbol, each of the plurality of data symbols of a second one of the plurality of data packet streams includes a second reference symbol; initiating, at a first time T1, a first capture of a periodic portion of the plurality of repetitive data slots of the first one of the plurality of data packet streams; and initiating, at a second time T2, a second capture of a periodic portion of the plurality of repetitive data slots of the second one of the plurality of data packet streams; wherein a difference between the first time T1 and the second time T2 equals the like periodicity of the plurality of repetitive data frames.

In accordance with another exemplary embodiment, a method for capturing multiple portions of a radiative multiple input, multiple output (MIMO) data packet signal received via a plurality of signal channels defining a channel matrix includes: receiving a control signal having a periodicity; receiving, via a plurality of signal channels, a radiative multiple input, multiple output (MIMO) data packet signal, wherein the MIMO data packet signal includes a plurality of data packet streams, each of the plurality of data packet streams includes a like plurality of repetitive data frames having the periodicity, each of the plurality of repetitive data frames includes a like plurality of repetitive data slots, each of the plurality of repetitive data slots includes a like plurality of data symbols, each of the plurality of data symbols of a first one of the plurality of data packet streams includes a first reference symbol, each of the plurality of data symbols of a second one of the plurality of data packet streams includes a second reference symbol; initiating, at a first time T1, a first capture of a periodic portion of the plurality of repetitive data slots of the first one of the plurality of data packet streams; and initiating, at a second time T2, a second capture of a periodic portion of the plurality of repetitive data slots of the second one of the plurality of data packet streams; wherein a difference between the first time T1 and the second time T2 equals the periodicity.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

As discussed in more detail below, new systems and methods are introduced for analyzing MIMO signals with need for only a single receiver on a multi-port tester. Example embodiments may include two time- and frequency-synchronized testers that take captured MIMO signals from multiple receive antennas virtually close to simultaneously (e.g., during successive time intervals closely spaced in time) which may then be jointly analyzed to recover the underlying data streams. While multiple solutions exist for analyzing over-the-air (OTA) MIMO signals, all known instances used previously require more than one receiver in their implementation, e.g., using time- and/or frequency-locked vector signal analyzers (VSAs).

Figure 1:
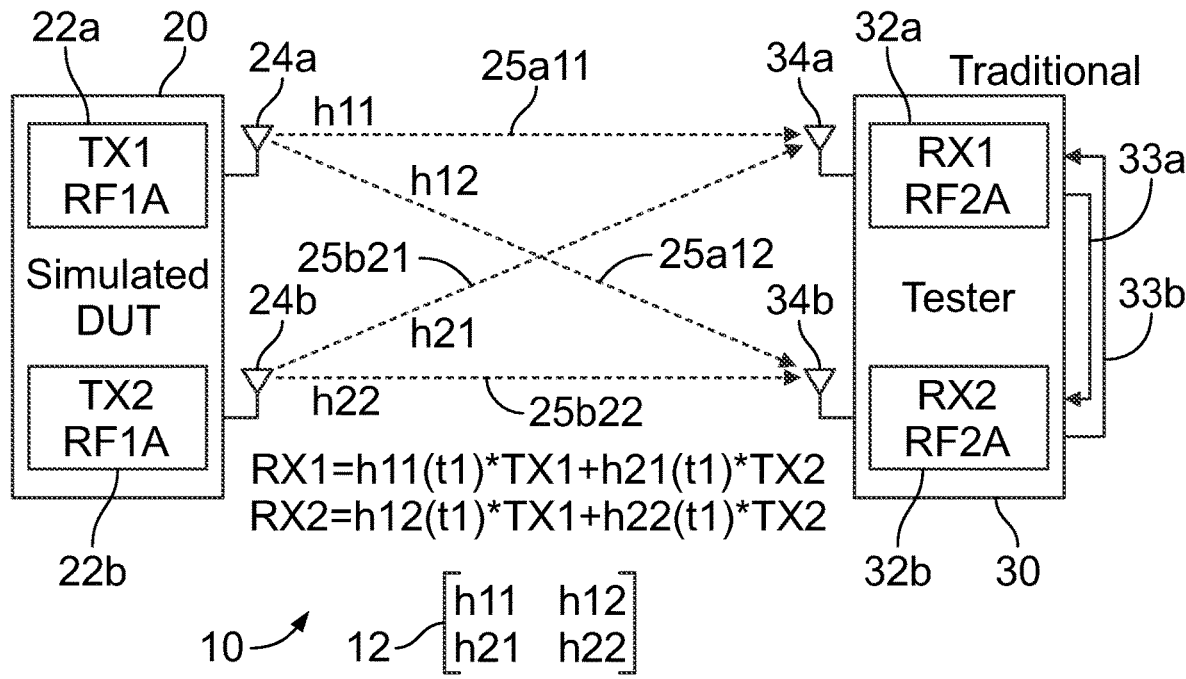
FIG. 1 depicts a classic testing environment for MIMO data packet transceiver systems.

Referring to FIG. 1, a traditional test environment 10 includes the MIMO transceiver device under test (DUT) 20 with multiple (e.g., two for this example, though it should be understood that other M×N MIMO implementations, in which M and N may be equal or unequal, may be used as well in accordance with this discussion) RF data packet signal transmitters 22a, 22b for emitting, via associated antennas 24a, 24b, their respective MIMO signal components 25a11, 25a12, 25b21, 25b22, and a MIMO tester 30 with multiple (e.g., also two for this example) RF data packet signal receivers 32a, 32b for receiving, via associated antennas 34a, 34b, their respective MIMO signal components 25a11, 25a12, 25b21, 25b22. In tests conducted for this example, transmit ports RF1A of two testers simulate the DUT 20 transmitting in 2×2 MIMO mode with two dual-port antennas 24a, 24b to create a mixed MIMO OTA channel, and receive ports RF2A of two other testers act as the tester 30 to capture both the horizontal polarization (H-POL) and vertical polarization (V-POL) signals for analysis. Mutual time-synchronization and/or frequency-synchronization of the receivers 32a, 32b (as well as exchange of captured signal information) may be enabled via one or more conductive signal connections 33a, 33b between the receivers 32a, 32b.

The medium through which the OTA signal components 25a11, 25a12, 25b21, 25b22 pass (i.e., the ambient atmosphere between the DUT 20 and tester 30) serves as a wireless signal channel that may be modeled as a signal channel H characterized by a hybrid matrix 12 (e.g., a 2×2 matrix in this example of 2×2 MIMO) where the matrix elements h11, h12, h21, h22 coefficients for respective signal channel characteristics (e.g., signal path conductivities or losses for the respective signal components 25a11, 25a12, 25b21, 25b22). As will be readily understood by one skilled in the art, this is due to the multiple wireless OTA signal paths available. For example, unlike a cabled signal environment, in a wireless channel the tester antennas 34a, 34b receive the transmitted DUT signals TX1 (first signal components 25a11, 25a12), TX2 (second signal components 25b21, 25b22) radiated by the DUT antennas 24a, 24b and affected in accordance with respective channel H matrix coefficients h11, h12, h21, h22. Accordingly, the received composite DUT signals RX1 (a first component signals sum 25a11+25b21), RX2 (a second component signals sum 25a12+25b22) received and captured via the tester antennas 34a, 34b may be characterized as follows:

$$RX1 = h11(t1)*TX1 + h21(t1)*TX2$$

$$RX2 = h12(t1)*TX1 + h22(t1)*TX2$$

Figure 2:
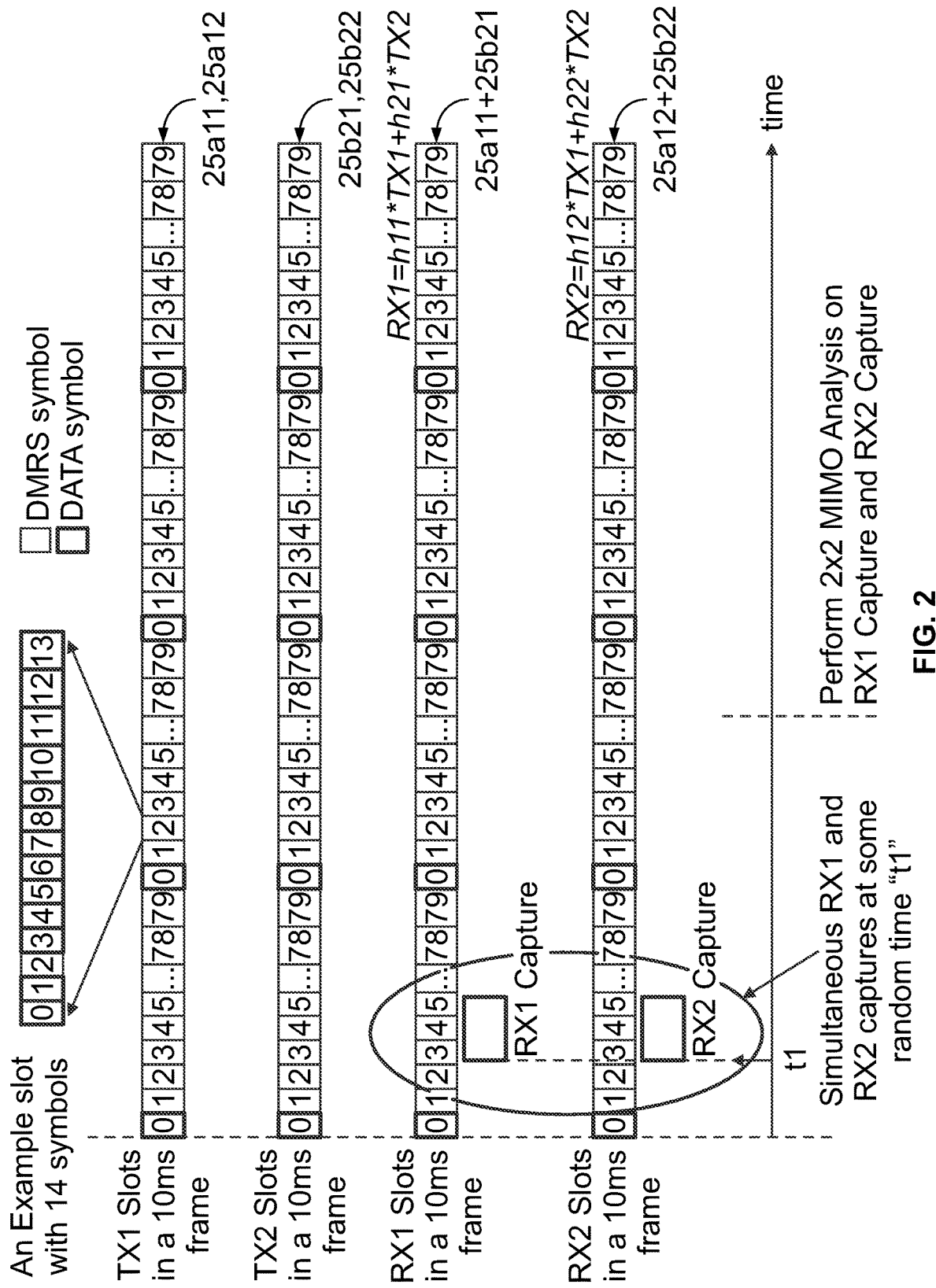
FIG. 2 depicts transmitted and captured data packet streams when testing MIMO data packet transceiver systems using classic techniques.

Referring to FIG. 2, the signal streams for such test environment 10 may be depicted as shown, in which the transmitted signals TX1, TX2 result in the signal components 25a11, 25a12, 25b21, 25b22 that include, in this example, frames having 10 millisecond (ms) intervals, each of which includes 80 (0-79) slots, each of which in turn includes 14 (0-13) symbols, of which as many as 12 are data symbols and at least one is a Demodulation Reference Symbol (DMRS). As discussed above, the time- and frequency-synchronized receivers capture their respective received signal streams RX1 (first component signals sum 25a11+25b21), RX2 (second component signals sum 25a12+25b22) simultaneously at a desired or otherwise predetermined time t1, following which at a subsequent time a M×N (e.g., 2×2 as in this example) MIMO analysis may be performed.

Figure 3:
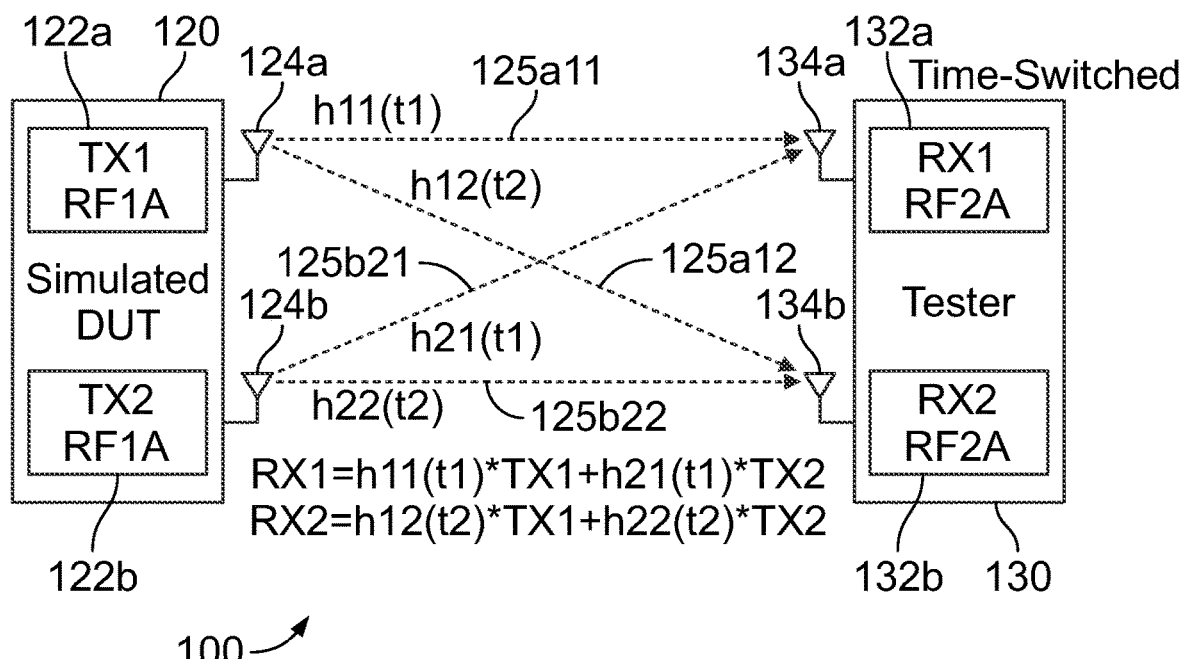
FIG. 3 depicts a testing environment for MIMO data packet transceiver systems in accordance with example embodiments.

Referring to FIG. 3, a test environment 100 in accordance with example embodiments includes the MIMO transceiver device under test (DUT) 120 with multiple (e.g., two for this example, though it should be understood that other M×N MIMO implementations, in which M and N may be equal or unequal, may be used as well in accordance with this discussion) RF data packet signal transmitters 122a, 122b for emitting, via associated antennas 124a, 124b, their respective MIMO signal components 125a11, 125a12, 125b21, 125b22, and a MIMO tester 130 with multiple (e.g., also two for this example) RF data packet signal receivers 132*a*, 132*b* for receiving, via associated antennas 134*a*, 134*b*, their respective MIMO signal components 125*a*11, 125*a*12, 125*b*21, 125*b*22. In tests conducted for this example, transmit ports RF1A from two testers simulate the DUT 120 transmitting in 2×2 MIMO mode with two dual-port antennas 124*a*, 124*b* to create a mixed MIMO OTA channel, and ports from two other testers act as the tester 130 to capture both the horizontal polarization (H-POL) and vertical polarization (V-POL) signals for analysis. In this type of test environment 100, the received composite DUT signals RX1 (a first component signals sum 125*a*11+125*b*21 with its capture initiated at a first time T1), RX2 (a second component signals sum 125*a*12+125*b*22 with its capture initiated at a second time T2) received and captured via the tester antennas 134*a*, 134*b* may be characterized as follows:

$$RX1 = h11(t1)*TX1 + h21(t1)*TX2$$

$$RX2 = h12(t2)*TX1 + h22(t2)*TX2$$

In tests conducted for this example embodiment of a "time-switched" test environment 100, transmit ports RF1A of two testers simulate the DUT 120 transmitting in 2×2 MIMO mode with two dual-port antennas 124*a*, 124*b* to create a mixed MIMO OTA channel (e.g., transmit on the left and receive on the right of the diagram), and receive ports ports of a another single tester 130 to capture both the H-POL and V-POL signals for analysis. As noted above and discussed in more detail below, mutual time-synchronization and/or frequency-synchronization of the receivers 132*a*, 132*b* is/are unnecessary.

Figure 4:
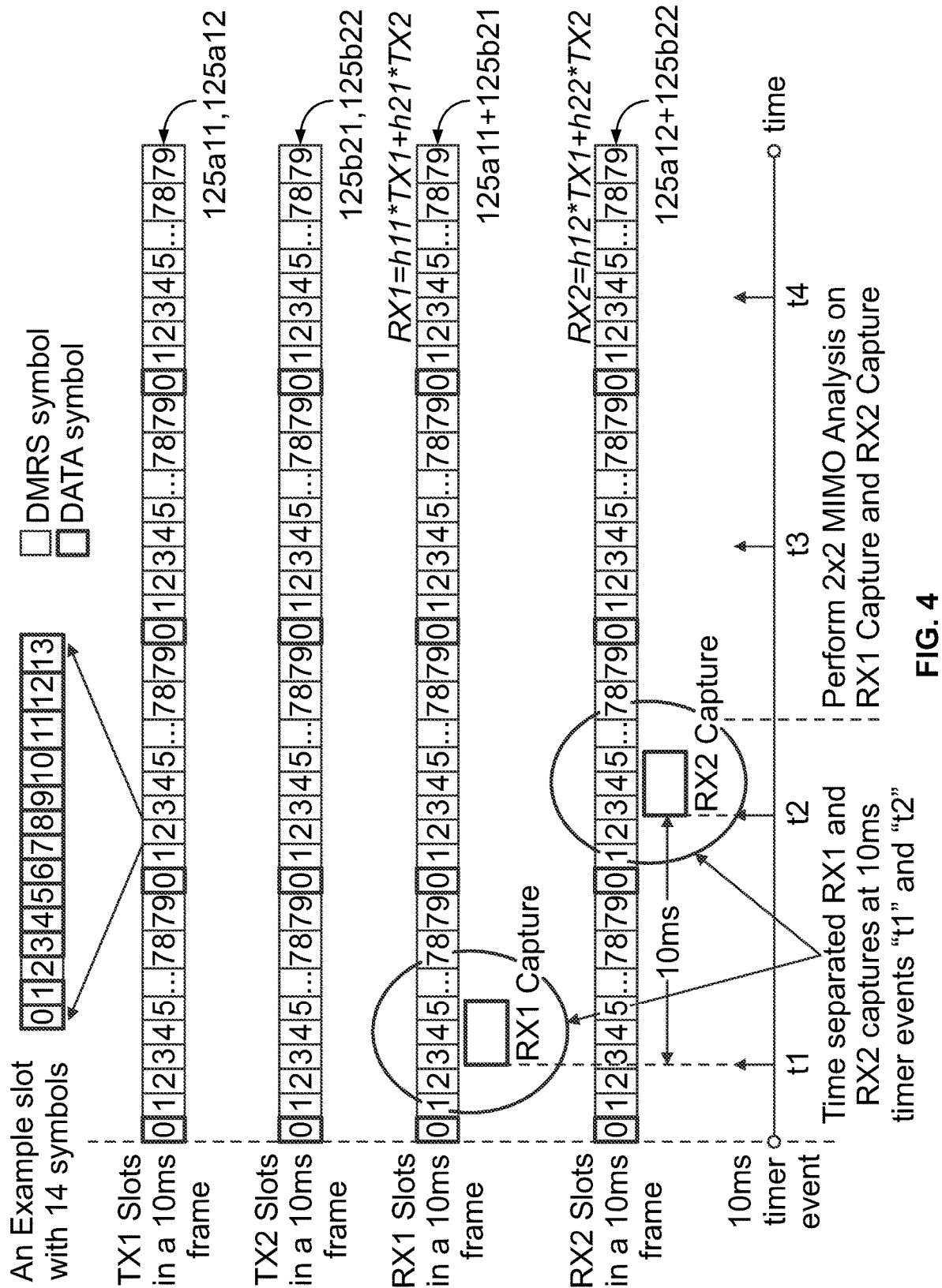
FIG. 4 depicts transmitted and captured data packet streams when testing MIMO data packet transceiver systems in accordance with example embodiments.

Referring to FIG. 4, the signal streams for such test environment 100 may be depicted as shown, in which the transmitted signals TX1, TX2 result in the signal components 125*a*11, 125*a*12, 125*b*21, 125*b*22 that include, in this example (for which mu=3 and SCS=120 kHz), frames having 10 millisecond intervals, each of which includes 80 (0-79) slots, each of which in turn includes 14 (0-13) symbols, of which as many as 12 are data symbols and at least one is a Demodulation Reference Symbol (DMRS). Notable differences, however, include transmitted signals TX1, TX2 having different data sequences of 10 ms duration, repeating these different data sequences at a 10 ms periodicity, and having different DMRS antenna port configurations. Further differences include received signals RX1, RX2 being captured serially by the same receiver in intervals separated by multiples of the same 10 ms periodicity, and with minimal delays between capture triggers (on the order of 10 ms) to ensure pseudo-stationarity. Accordingly, a 10 ms timer with a 10 ms periodicity may be configured on the tester 130 such that it is guaranteed that the same segments of the repeated 10 ms frames in both received signals RX1, RX2 are captured for analysis.

With pseudo-stationarity established as noted above, the channel parameters h11, h12, h21, h22 should not change significantly during the 10 ms intervals between the two captures. Similarly, DUT impairments such as frequency errors or timing drifts between the transmitters 122*a*, 122*b* should be very similar across such a short time interval (though both such parameters may be measured and compensated during the analysis). Certain measurements (e.g., time alignment errors) should even be improved by implementing this method as the amount of timing error accumulated across such a short time interval (e.g., 10 ms) by the internal timer should be much smaller than that incurred across the traditional cross-triggering method spanning multiple testers. (It should be noted that while this example uses a 10 ms timer, other timer values, e.g., 1 ms, may be used as well so long as the capture sequences of the transmitted signals TX1, TX2 are repeated at the same periodicity, e.g., 1 ms.)

Hence, from these two examples it can be readily understood that in a traditional test environment 10 (FIG. 1), the received signals RX1, RX2 are captured by different receivers 32*a*, 32*b* but both captures are initiated at time t1. In contrast thereto, in a time-switched test environment 100 (FIG. 3), the received signals RX1, RX2 are captured by receivers 132*a*, 132*b* residing within a common tester 130 but the first signal RX1 capture is initiated at time t1 and the second signal RX2 capture is initiated at time t2.

Based upon the foregoing discussion, it can be seen that This invention provides a cost-reduced means of analyzing MIMO signals using a single receiver which can be time-switched across the multiple MIMO streams in a time- and frequency-synchronized manner. Previous solutions require multiple synchronized receivers.

Additionally, various measurements, such as time alignment error (TAE) may be improved since a distributed VSA architecture of a typical MIMO configuration can incur triggering and/or sampling delays between captured data packets.

Various other modifications and alternatives in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for capturing portions of a radiative multiple input, multiple output (MIMO) data packet signal, the method comprising:
   receiving, via a plurality of signal channels, the radiative MIMO data packet signal, wherein:
      the radiative MIMO data packet signal includes a plurality of data packet streams, at least two of the plurality of data packet streams being based on different channel coefficients,
      each of the plurality of data packet streams includes a plurality of repetitive data frames having a same periodicity,
      each of the plurality of repetitive data frames includes a plurality of repetitive data slots ordered in sequence, and
      each of the plurality of repetitive data slots includes a plurality of data symbols;
   initiating, at a first time T1 and by a first receiver, a first capture of a first periodic portion of the plurality of repetitive data slots of a first one of the plurality of data packet streams; and
   initiating, at a second time T2 and by a second receiver that is different than the first receiver, a second capture of a second periodic portion of the plurality of repetitive data slots of a second one of the plurality of data packet streams;
   wherein the first periodic portion comprises a first set of slots, the second periodic portion comprises a second set of slots, and the first set of slots and the second set of slots are the same slots in sequence in, respectively, the first one of the plurality of data packet streams and the second one of the plurality of data packet streams.

2. The method of claim 1, wherein the plurality of data symbols comprises a plurality of repetitive data symbols.

3. The method of claim 1, wherein each of the plurality of data symbols of tthe first one of the plurality of data packet streams includes a first reference symbol;
wherein each of the plurality of data symbols of the second one of the plurality of data packet streams includes a second reference symbol; and
wherein the first and second reference symbols are mutually orthogonal.

4. The method of claim 1, further comprising:
measuring the periodicity of the plurality of repetitive data frames; and
generating a control signal having the periodicity of the plurality of repetitive data frames;
wherein at least the first and second captures are initiated in response to part of the control signal.

5. The method of claim 1, further comprising:
determining an estimated channel matrix in accordance with at least the first and second periodic portions that were captured and at least first and second reference symbols.

6. A method for capturing portions of a radiative multiple input, multiple output (MIMO) data packet signal, the method comprising:
receiving a control signal having a periodicity;
receiving, via a plurality of signal channels, the radiative MIMO data packet signal, wherein:
the radiative MIMO data packet signal includes a plurality of data packet streams, at least two of the plurality of data packet streams being based on different channel coefficients,
each of the plurality of data packet streams includes a plurality of repetitive data frames having the periodicity,
each of the plurality of repetitive data frames includes a plurality of repetitive data slots ordered in sequence, and
each of the plurality of repetitive data slots includes a plurality of data symbols;
initiating, at a first time T1 in response to a part of the control signal by a first receiver, a first capture of a first periodic portion of the plurality of repetitive data slots of a first one of the plurality of data packet streams; and
initiating, at a second time T2 in response to a part of the control signal and by a second receiver that is different than the first receiver, a second capture of a second periodic portion of the plurality of repetitive data slots of a second one of the plurality of data packet streams;
wherein the first periodic portion comprises a first set of slots, the second periodic portion comprises a second set of slots, and the first set of slots and the second set of slots are the same slots in sequence in, respectively, the first one of the plurality of data packet streams and the second one of the plurality of data packet streams.

7. The method of claim 6, wherein the plurality of data symbols comprises a plurality of repetitive data symbols.

8. The method of claim 6, wherein each of the plurality of data symbols of the first one of the plurality of data packet streams includes a first reference symbol;
wherein each of the plurality of data symbols of the second one of the plurality of data packet streams includes a second reference symbol; and
wherein the first and second reference symbols are mutually orthogonal.

9. The method of claim 6, further comprising:
determining an estimated channel matrix in accordance with at least the first and second periodic portions that were captured and at least first and second reference symbols.

10. The method of claim 5, wherein determining comprises performing a computation.

11. The method of claim 9, wherein determining comprises performing a computation.

12. A system for capturing portions of a radiative multiple input, multiple output (MIMO) data packet signal, the system comprising:
(i) a first receiver configured to receive a first data packet stream of the radiative MIMO data packet signal;
(ii) a second receiver that is different from the first receiver, the second receiver being configured to receive a second data packet stream of the radiative MIMO data packet signal, the first and second data packet streams being based on different channel coefficients, wherein:
each of the first and second of data packet streams includes a plurality of repetitive data frames having a same periodicity,
each of the plurality of repetitive data frames includes a plurality of repetitive data slots ordered in sequence, and
each of the plurality of repetitive data slots includes a plurality of data symbols;
(iii) one or more programmable processors configured to perform operations comprising:
causing the first receiver to initiate, at a first time T1, a first capture of a first periodic portion of the plurality of repetitive data slots of the first data packet stream; and
causing the second receiver to initiate, at a second time T2, a second capture of a second periodic portion of the plurality of repetitive data slots of the second data packet stream;
wherein the first periodic portion comprises a first set of slots, the second periodic portion comprises a second set of slots, and the first set of slots and the second set of slots are the same slots in sequence in, respectively, the first data packet stream and the second data packet stream.

13. The system of claim 12, wherein the plurality of data symbols comprises a plurality of repetitive data symbols.

14. The system of claim 12, wherein each of the plurality of data symbols of the first data packet stream includes a first reference symbol;
wherein each of the plurality of data symbols of the second data packet stream includes a second reference symbol; and
wherein the first and second reference symbols are mutually orthogonal.

15. The system of claim 12, wherein one or more programmable processors are configured to perform operations comprising
measuring the periodicity of the plurality of repetitive data frames; and
generating a control signal having the periodicity of the plurality of repetitive data frames, parts of the control signal to cause the first and second captures.

16. The systemof claim 12, wherein one or more programmable processors are configured to perform operations comprising:

determining an estimated channel matrix in accordance with at least the first and second periodic portions that were captured and at least first and second reference symbols.

17. The system of claim 16, wherein determining comprises performing a computation.

18. A system for capturing portions of a radiative multiple input, multiple output (MIMO) data packet signal received via a plurality of signal channels defining a channel matrix, the system comprising:
   (i) a first receiver configured to receive a first packet data stream of the radiative MIMO data packet signal;
   (ii) a second receiver that is different from the first receiver, the second receiver being configured to receive a second data packet stream of the radiative MIMO data packet signal, the first and second data packet streams being based on different channel coefficients, wherein:
      each of the first and second data packet streams includes a plurality of repetitive data frames having a same periodicity,
      each of the plurality of repetitive data frames includes a plurality of repetitive data slots ordered in sequence, and
      each of the plurality of repetitive data slots includes a plurality of data symbols;
   (iii) one or more programmable processors configured to perform operations comprising:
      causing the first receiver to initiate, at a first time T1 and in response to part of a control signal, a first capture of a first periodic portion of the plurality of repetitive data slots of the first data packet stream; and
      causing the second receiver to initiate, at a second time T2 and in response to part of the control signal, a second capture of a second periodic portion of the plurality of repetitive data slots of the second data packet stream;
   wherein the first periodic portion comprises a first set of slots, the second periodic portion comprises a second set of slots, and the first set of slots and the second set of slots are the same slots in sequence in, respectively, the first data packet stream and the second data packet stream.

19. The system of claim 18, wherein the plurality of data symbols comprises a plurality of repetitive data symbols.

20. The system of claim 18, wherein each of the plurality of data symbols of the first data packet stream includes a first reference symbol;
   wherein each of the plurality of data symbols of the second data packet stream includes a second reference symbol; and
   wherein the first and second reference symbols are mutually orthogonal.

21. The system of claim 18, wherein the one or more programmable processors are configured to perform operations comprising:
   determining an estimated channel matrix in accordance with at least the first and second periodic portions that were captured and at least first and second reference symbols.

* * * * *